United States Patent Office.

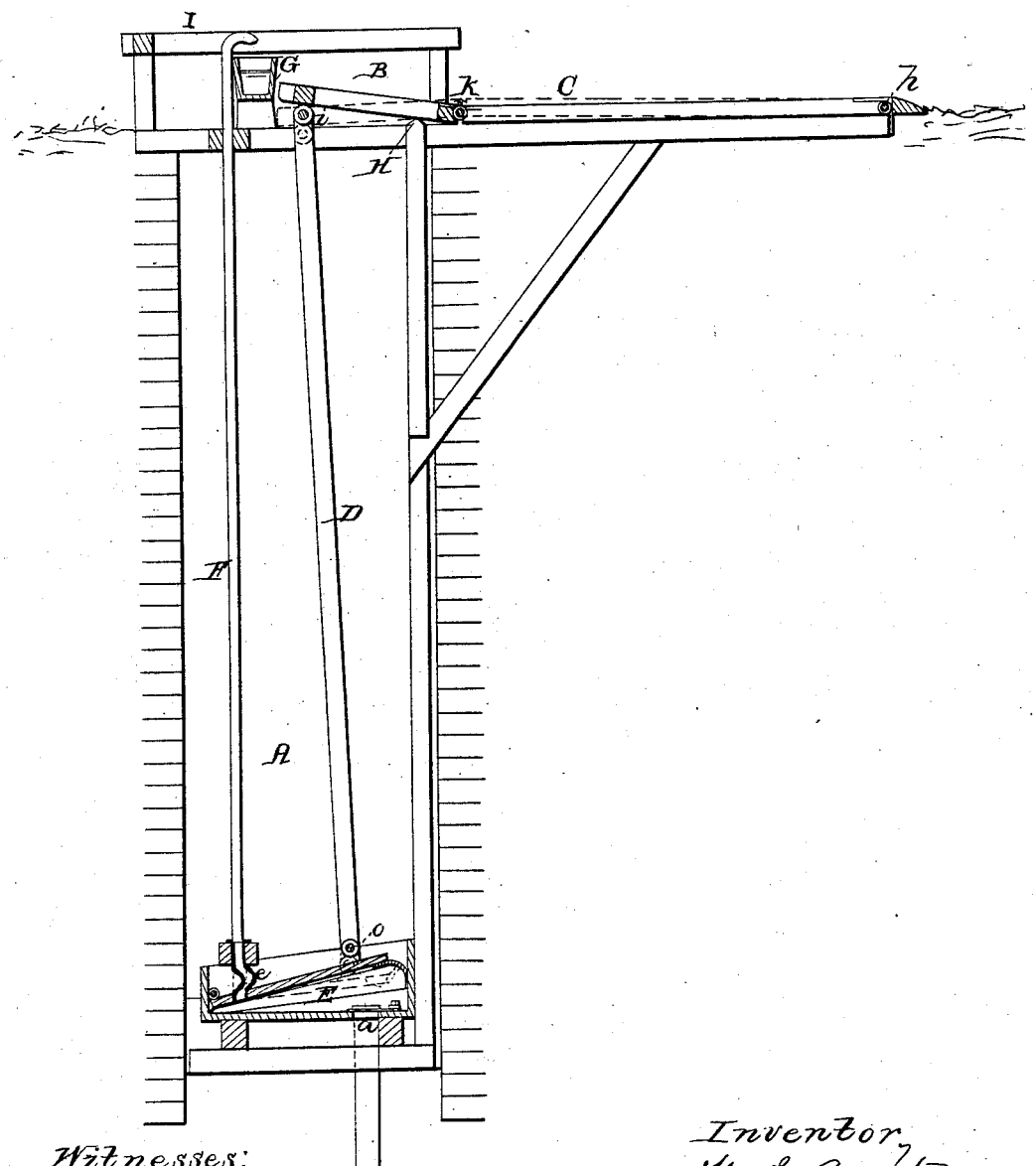

W. T. ARMSTRONG, OF FREELAND, ILLINOIS.

Letters Patent No. 82,064, dated September 15, 1868.

IMPROVEMENT IN STOCK-PUMPS.

The Schedule referred to in these Letters Patent and making part of the same.

TO ALL WHOM IT MAY CONCERN:

Be it known that I, W. T. ARMSTRONG, of Freeland, in the county of De Kalb, and State of Illinois, have invented certain new and useful Improvements in Automatic Stock and Cattle-Pumps; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to an improvement in the construction of stock or cattle-pumps, which is automatic in its operation, being operated by the weight of the animal stepping on the platform to drink.

In the drawing, my pump is shown by a longitudinal vertical section taken through the centre.

A represents an ordinary well, in the bottom of which is placed a pump, of that class commonly known as "bellows-pumps," it being secured in place by having its lower side or leaf bolted to a frame in the bottom of the well, the whole being submerged in the water, the upper leaf being free to move on its hinge at the back end.

On the surface of the ground, and to one side of the well, I construct a platform, C, the end furthest from the well being hinged, at $h$, to a stationary frame. This platform has connected to it, at the opposite end, by means of a hinge, a second platform, B, of the same width, but somewhat shorter.

The forward end extending over the top of the well to about the centre, near the rear end of the platform B, I place a fulcrum or pivot, H, fastened firmly in place, and on which the platform B is free to rock.

To the under side of B, at a point, $i$, near the centre of the well, I hinge or pivot a pitman or rod, D, which extends down into the well, and is pivoted to the loose end of the upper leaf of the pump at $o$, so that when the front end of platform B is raised, it lifts the leaf of the pump with it.

To conduct the water from the bottom of the well to the surface of the ground, I provide a pipe, F, fastened rigidly to the frame, both at top and bottom. The lower end of this pipe is connected to the pump by means of a flexible tube, $e$, of rubber or other suitable material, so as to allow the pump-leaf to rise and fall without hindrance, and at the same time have a tight connection between the pump E and pipe F without the use of the ordinary expensive stuffing-boxes and collars.

The upper end of pipe F is bent into the form of a goose-neck, so as to deliver the water into the stationary tub or trough G, from which the stock drink at will.

The compound platform B C is wide enough to allow one animal at a time to walk upon it to drink; and to prevent them from getting to the trough on any side but that on which the platform is, I surround the trough and platform on three sides with a fence or railing, I, as shown in the drawing, so that it follows necessarily that whenever an animal drinks he must operate the pump.

Having thus fully described my invention, I will now proceed to show the operation.

The parts being in the position shown in the drawing, the animal first walks up on to the platform C, and then goes forward toward the trough G, the platform remaining stationary until the weight passes forward of the fulcrum H, when the platform B immediately drops down, forcing down the pitman D, and it, in turn, operating the pump and forcing the water up pipe F and over into the trough G, the parts being shown in this second position in red lines.

When the animal, in retiring from the platform, passes fulcrum H, and steps on to platform C, it in turn drops down, raising the forward end of platform B, and with it the upper leaf of the pump, when the water will rush in through valve $a$ and fill the pump, ready for operation again.

It is obvious that the pump may be located above the water in the well, and having a suction-pipe connecting with its under side, and extending down into the water, as shown in blue lines, in which case the operation will be the same and the pump more convenient of access.

By this means I construct a very simple and cheap pump, which is not liable to become disarranged by stones or dirt getting into, on, or under it, and which will not be easily affected by snow or ice, as are the more complicated ones now in use, and by having the trough stationary and independent of the platform, I am enabled to do away with the counterpoise generally used, so that the frame and platform may be made much lighter than is ordinarily done.

Having thus fully described my invention, what I desire to secure by Letters Patent, is—

The box-pump E, constructed as described, in combination with the stationary pipe F, rod D, and the compound-hinged platform B C, all constructed and arranged to operate substantially as shown and described.

W. T. ARMSTRONG.

Witnesses:
W. H. KENYON,
M. M. ARMSTRONG.